United States Patent
Uy et al.

(10) Patent No.: US 9,713,768 B2
(45) Date of Patent: Jul. 25, 2017

(54) GAME CONTROLLER

(71) Applicant: Razer (Asia-Pacific) Pte. Ltd., Singapore (SG)

(72) Inventors: Lawrence King Uy, Singapore (SG); Weiming Gabriel Chan, Singapore (SG); Zizhong Yu, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/430,882

(22) PCT Filed: Sep. 26, 2012

(86) PCT No.: PCT/SG2012/000358
§ 371 (c)(1),
(2) Date: Mar. 24, 2015

(87) PCT Pub. No.: WO2014/051515
PCT Pub. Date: Apr. 3, 2014

(65) Prior Publication Data
US 2015/0238855 A1 Aug. 27, 2015

(51) Int. Cl.
*A63F 13/24* (2014.01)
*G06F 3/0338* (2013.01)
*G06F 3/0362* (2013.01)
*H01H 23/30* (2006.01)

(52) U.S. Cl.
CPC ............ *A63F 13/24* (2014.09); *G06F 3/0338* (2013.01); *G06F 3/0362* (2013.01); *A63F 2300/1043* (2013.01); *H01H 23/30* (2013.01)

(58) Field of Classification Search
CPC .. G06F 3/0219; G06F 3/30362; G06F 3/0338; G06F 3/362; G06F 3/0338; A63F 13/24; A63F 2300/1043; H01H 23/30
See application file for complete search history.

(56) References Cited

U.S. PATENT DOCUMENTS

| | | |
|---|---|---|
| 5,087,910 A | 2/1992 | Guyot-Sionnest |
| 5,874,906 A | 2/1999 | Willner et al. |
| 6,288,709 B1 | 9/2001 | Willner et al. |
| 6,659,870 B2 | 12/2003 | Sobota |

(Continued)

FOREIGN PATENT DOCUMENTS

JP    2002-248267 A    9/2002

OTHER PUBLICATIONS

First Office Action issued Jul. 21, 2015 in Taiwanese Patent Application No. 102134489, 5 pages.

(Continued)

*Primary Examiner* — Jasson Yoo
(74) *Attorney, Agent, or Firm* — Polsinelli PC

(57) ABSTRACT

The present invention is a game controller including a housing; a plurality of game controls disposed on a first side of the housing; a lever disposed on a second side of the housing; a first switch configured to contact a first end region of the lever; and a second switch configured to contact a second end region of the lever, wherein the lever is configured to pivot between a neutral position in which the lever returns when no force is applied thereon, a first position in which the first switch is activated and a second position in which the second switch is activated. In another aspect, a lever assembly is also disclosed.

20 Claims, 17 Drawing Sheets

(56) References Cited

U.S. PATENT DOCUMENTS

| | | | |
|---|---|---|---|
| 2002/0128064 A1* | 9/2002 | Sobota | A63F 13/06 463/37 |
| 2002/0169023 A1 | 11/2002 | Tanaka | |
| 2004/0135767 A1* | 7/2004 | Park | G06F 3/0338 345/156 |
| 2004/0222964 A1 | 11/2004 | Martinez et al. | |
| 2004/0222970 A1 | 11/2004 | Martinez et al. | |
| 2006/0262090 A1* | 11/2006 | Higginson | G05G 9/047 345/161 |
| 2010/0109915 A1 | 5/2010 | Scarboro | |
| 2010/0298053 A1 | 11/2010 | Kotkin | |
| 2011/0300942 A1 | 12/2011 | Jaouen et al. | |

OTHER PUBLICATIONS

International Search Report mailed Apr. 29, 2013 in International Application No. PCT/SG2012/000358, 4 pages.
Written Opinion mailed Apr. 29, 2013 in International Application No. PCT/SG2012/000358, 4 pages.
International Preliminary Report on Patentability mailed Mar. 31, 2015 in International Application No. PCT/SG2012/000358, 5 pages.
Extended European Search Report for EP application No. 12885814.9 mailed May 13, 2016.

* cited by examiner

GAME CONTROLLER

TECHNICAL FIELD

Various embodiments generally relate to a gaming device, in particular, a game controller.

BACKGROUND

A typical gamepad or hand-held gaming device basically includes joysticks, action buttons, directional gamepads, multifunction triggers and/or (bumper) buttons. FIGS. 1A and 1B respectively show a front view and a side view of an exemplary existing gaming device 100. The gaming device 100 is usually held with a user's thumbs (not shown) positioned on a top panel 102 triggering joysticks 104, action buttons 106 or directional gamepads 108 while the index fingers (not shown) positioned on a front 110 of the gaming device 100 switching multifunction triggers 112 or buttons 114.

At times, there are users who place their middle fingers at the front 110 together with their index fingers. However, more than often middle fingers which are positioned at the front 110 are overlapping the index fingers; thereby interfering the index fingers' movements since the index fingers can actually reach all positions in the front 110. In addition, most of the gamepad have pull triggers 112 which are variable switches that are best triggered by most users' index fingers due to the index finger's higher dexterity as compared to their middle fingers.

Thus, more efficient and improved designs of gaming devices are desirable.

SUMMARY OF THE INVENTION

In an aspect, the present invention relates to a game controller including a housing; a plurality of game controls disposed on a first side of the housing; a lever disposed on a second side of the housing; a first switch configured to contact a first end region of the lever; and a second switch configured to contact a second end region of the lever, wherein the lever is configured to pivot between a neutral position in which the lever returns when no force is applied thereon, a first position in which the first switch is activated and a second position in which the second switch is activated.

In another aspect, a lever assembly for a game controller is provided. The lever assembly includes a lever configured to pivot between a neutral position in which the lever returns when no force is applied thereon, a first position in which the lever moves when a force is applied on one end of the lever and a second position in which the lever moves when another force is applied to another end of the lever; a securing means configured to detachably secure the lever to a game controller; and a bracket configured to hold the securing means to the lever.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may, be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1A:
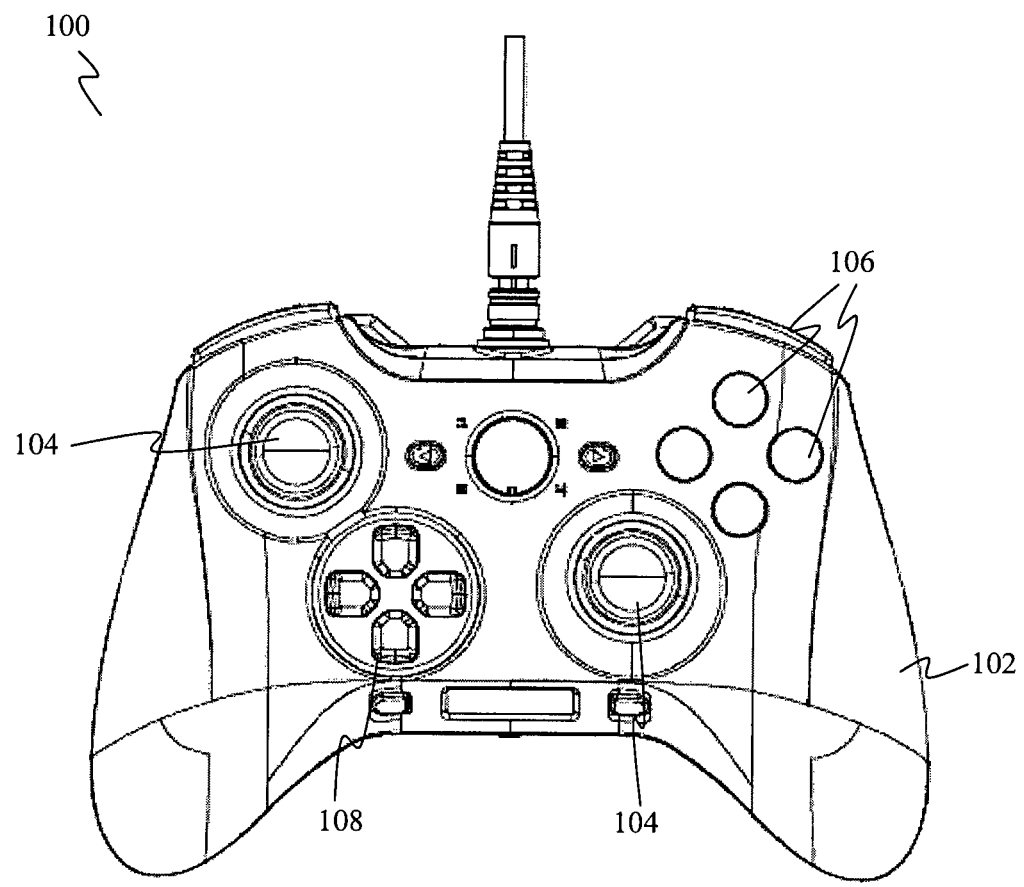
FIG. 1 shows (A) a front view and (B) a side view of an exemplary existing gaming device.
Figure 1B:
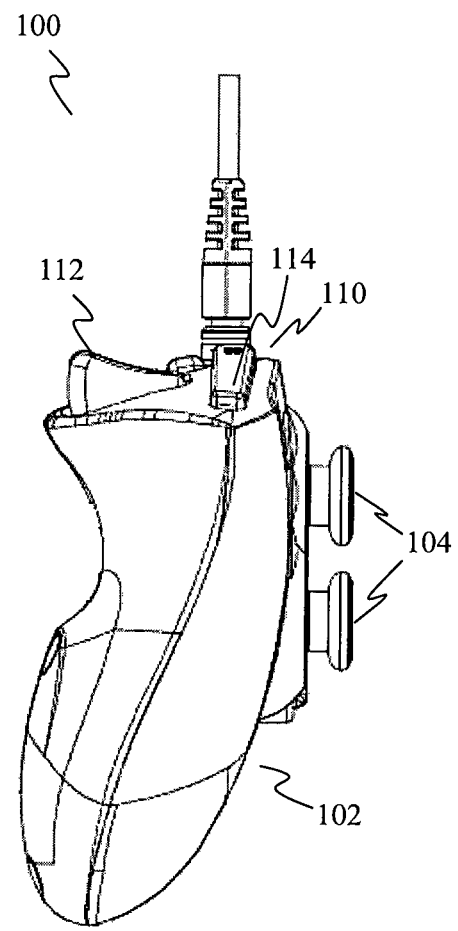

Various embodiments provide a gaming device having a set of game controls on its top panel and its front including, for example, joysticks, action buttons, directional gamepads, multifunction triggers and/or buttons; and another set of triggers placed on its underside (or bottom), designed specifically for triggering by a user's middle finger. For example, the top panel and the front may refer to the top panel 102 and the front 110 of FIG. 1B. In some embodiments, the other set of triggers may either share some gaming functions of the buttons triggered by the user's index finger or simply carry other functions in gaming.

For example, additional multi-function triggering features may be added on an existing gamepad or gaming device for the user's middle fingers to use so as to provide more advantage in a gaming environment where additional commands with speed is critical in playing and/or winning a game. Utilizing the movement of the fingers such as the middle fingers or the ring fingers or the little fingers (pinkies) therefore adds advantage to the user.

Various embodiments provide a middle-finger flick, pull and or push activation switch for a gaming device.

Figure 2:
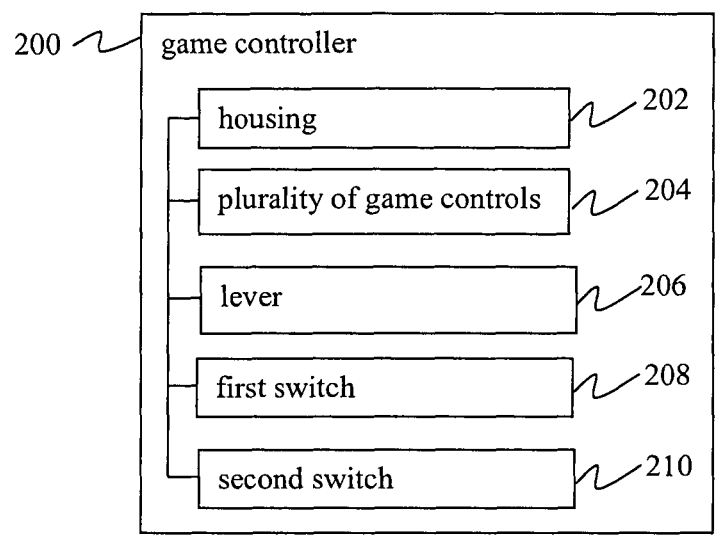
FIG. 2 shows a schematic block diagram of a game controller, in accordance to various embodiments.

In an aspect, a game controller 200 is provided as shown in FIG. 2. The game controller 200 includes a housing 202; a plurality of game controls 204 disposed on a first side of the housing 202; a lever 206 disposed on a second side of the housing 202; a first switch 208 configured to contact a first end region of the lever 206; and a second switch 210 configured to contact a second end region of the lever 206, wherein the lever 206 is configured to pivot between a neutral position in which the lever 206 returns when no force is applied thereon, a first position in which the first switch 208 is activated and a second position in which the second switch 210 is activated.

In the context of various embodiments, the term "game controller" may interchangably be referred to as gaming controller, gaming device, gamepad, video game controller, game controller unit, controller, controller unit, game console, gaming console, gaming console unit, console unit, gaming input device or gaming input unit. It should be understood and appreciated that a game controller, for example, the game controller 200 may generally refer to any device that is configured to send signals to execute a game program or gaming function. The game program may be but is not limited to a video game program or a computer game program. For example, the game controller 200 may be for use with a PLAYSTATION system (made by Sony Corporation) or a XBOX system (made by Microsoft Corporation).

As used herein, the term "plurality of game controls" refers to input components of the game controller 200 that is assessed and activated by a user to execute a game program or gaming function.

In various embodiments, the plurality of game controls 204 may include at least one of a pushbutton, a joystick or a directional pad. For example, the pushbutton, the joystick and the directional pad may be the action button 106, the joystick 104 and the directional gamepad 108 of FIG. 1A, respectively.

For example, the plurality of game controls 204 may be triggered by a user's thumb(s) and/or index finger(s).

The term "lever" may broadly mean any mechanical device or actuator that can be moved between at least two positions. For example, when the lever 206 is actuated, it usually transmits a force to an additional trigger located at one of the at least two positions. The lever 206 may be in contact with the additional trigger. For example, the additional trigger may be the first switch 208 or the second switch 210.

For example, the lever 206 may be of an elongate structure having end regions that may be configured to contact or make contact with additional triggers located at two positions. In this context, the phrase "configured to contact" generally refers to making direct (physical) contact. For example, when an additional trigger (or switch) is "configured to contact" an end region of a lever, this may mean that a surface of the additional trigger abuts or touches a surface of the end region of the lever. In a different example, the phrase "configured to contact" may refer to making indirect contact, for example, the additional trigger may come into direct contact with an intermediate component such as an adaptor or a gear, which then make direct contact to the end region of the lever. By contacting the additional trigger to the end region of the lever, an exerting force is applied onto the additional trigger; thereby activating it.

The lever 206 may be pivotable about a pivot point to move from one of the two positions to the other. The lever 206 may resume the neutral position which is a position where the lever does not make contact with any of the additional triggers located at the two positions. For example, if the contact surfaces of the additional triggers lie on a plane, the neutral position may be a position where the lever is parallel to this plane. The lever 206 may resume the neutral position when no force is applied on the lever 206. The lever 206 may resume the neutral position due to a bias, for example, a spring. In other embodiments, the lever 206 may return to its neutral position due to the spring bias of the switches 208 and 210.

As used herein, the pivot point may be proximate to the second side of the housing. For example, the pivot point may be arranged to be located inside the housing or sitting on a printed circuit board (PCB) within the housing or an internal part of the housing such that the lever pivoting about the pivot point is disposed on the second side of the housing. In other examples, the pivot point may be arranged at the second side of the housing.

As used herein, the phrase "end region" may refer to the corners, edges, ends or substantially ends of a lever. The end region may have a surface, for example, a bottom surface, configured to contact or abut the switch (e.g., the first switch 208 or the second switch 210).

In various embodiments, the lever 206 may be configured to pivot from the first position to the second position via the neutral position. The lever 206 may be configured to pivot about a pivot point, as defined above.

In various embodiments, the lever 206 may be configured to pivot from the second position to the first position via the neutral position.

As used herein, the term "switch" usually refers to an electrical or electro-mechanical device with contacts and by changing the position of the switch alters the states of the contacts. For example, one state may relate to turning a device on while another state may relate to turning the device off. In this context, the switch does not refer to a power on-off switch for the game controller.

The first switch 208 and the second switch 210 may be but are not limited to biased switches (e.g. pushbutton switches), toggle switches, or a combination of both.

In one example, the lever 206 and the first and second switches 208, 210 may be integrated into a switch package. For example, the switch package may be a rocker switch.

As used herein, the term "activated" may interchangably be referred to as triggered, turned on, initiated, or started.

In the context of various embodiments, the term "side" with respect to the housing 202 means a face of the housing 202. For example, the "side" may refer but is not limited to the top panel 102 or the front 110 of the gaming device of FIG. 1B. The underside or bottom as opposed to the top panel 102 may also be referred to as a "side" of housing 202.

In various embodiments, the first side of the housing 202 may be an upper side of the housing 202 and the second side of the housing 202 may be an underside of the housing 202.

Various embodiments provide a game controller with additional triggers or switches which may be activated by actuating a lever which is configured to make contact with the additional triggers. The additional triggers may be located on the underside of a housing of the game controller while the upper side of the housing is the side accommodating a plurality of game controls which are or may be triggered by a user's thumb(s) and/or index finger(s). The lever may be actuated by the movement of a finger, for example, the user's middle finger when the game controls are triggered using the user's thumb(s) and/or index finger (s). The additional triggers are not the same as and do not refer to the game controls. In some examples, the lever may also be actuated by the user's ring finger or little finger (pinky). The lever may be best actuated by the movement of the user's middle finger due to the middle finger's higher dexterity as compared to the ringer finger and little finger. The lever is pivotable about a pivot point and may allow the user's finger to glide along its surface to reach and activate the additional triggers which are usually placed apart from one another. The lever advantageously provides a guide for the user's fingers so that the user can move from one of the additional triggers to another quickly and accurately. Such fast activation of the additional triggers are usually required in gaming in order to achieve good gaming results or to win a game. The additional trigger may be activated when the lever is actuated by a force exerted into the additional trigger, for example, the force may be exerted directly from above the additional trigger which allows the force to be in the same direction as the movement of the additional trigger. In another example, the additional trigger may be, activated and move in a direction when the lever is actuated by a force applied along the lever, the force being in another direction substantially normal to the direction in which the additional trigger moves. In some examples, a force may be applied any where along the lever away from the pivot point to activate the additional triggers.

In various embodiments, the first switch 208 may be activated when a force into the direction of the first switch 208 is applied to the lever 206.

In various embodiments, the second switch 210 may be activated when another force into the direction of the second switch 210 is applied to the lever 206.

In further embodiments, the lever 206 may be configured to pivot about a pivot point to the first position or the second position by exerting a pulling force or a flicking force or a pushing force on the lever 206 into the direction of the first switch 208 and the direction of the second switch 210, respectively, wherein the pulling force is a force exerted in an opposite direction to the flicking force.

Figure 3A:
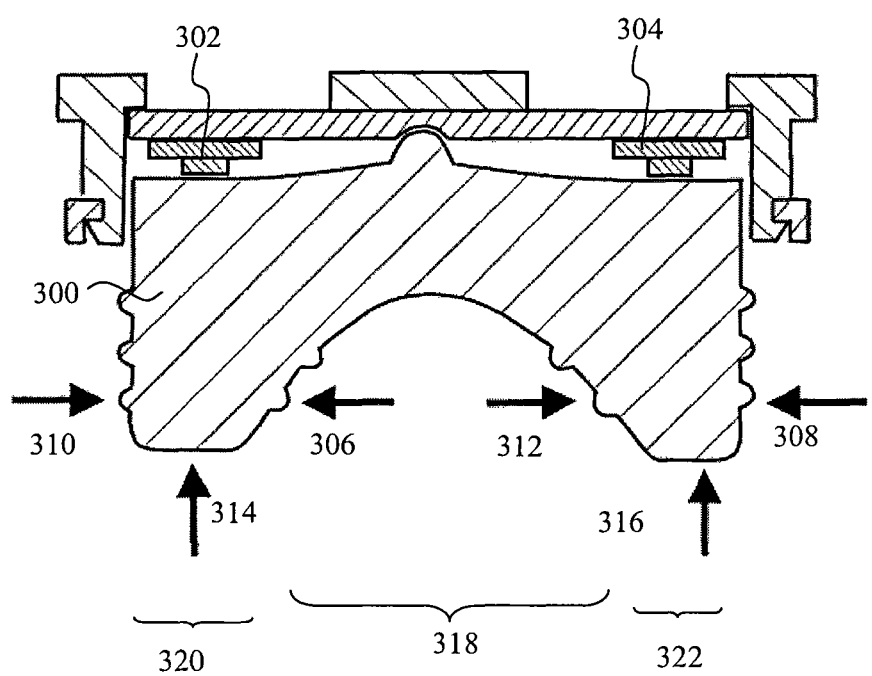
FIGS. 3A to 3C show cross-sectional views of an exemplary lever configured to activate switches, in accordance to various embodiments.

FIG. 3A shows an exemplary lever 300 configured to activate a first switch 302 and a second switch 304 in accordance to various embodiments. In FIG. 3A, the lever 300 may experience a pulling force or a flicking force or a pushing force, for example, as shown by left-pointing arrows 306, 308 or right-pointing arrows 310, 312 or upward pointing arrows 314, 316, respectively.

In the context of various embodiments, the pulling force and/or the flickering force may be a force exerted along the lever 300 and is in a direction normal to the actuation movement of the first switch 302 or the second switch 304. The pushing force may be a force exerted on the lever 300 and into the first switch 302 or the second switch 304, i.e., in the same direction as the actuation movement of the first switch 302 or the second switch 304.

Figure 3B:
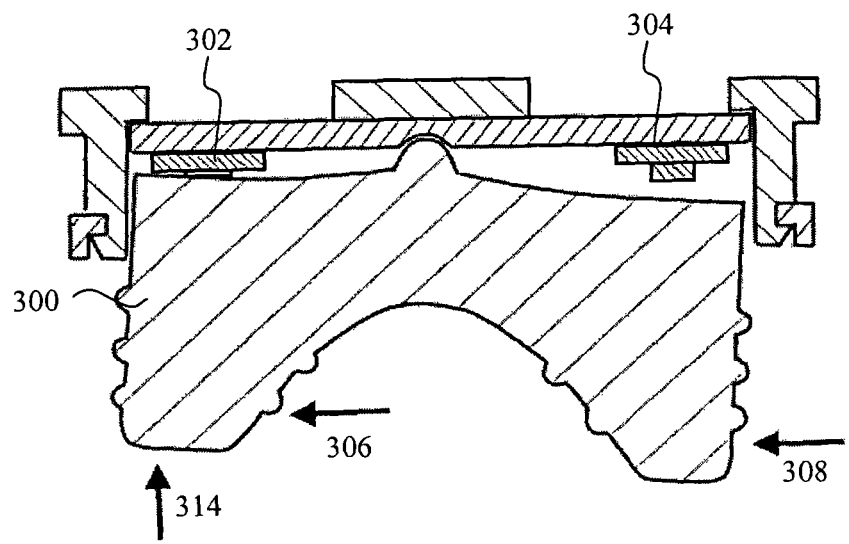

For example, FIG. 3B shows the activation of the first switch 302 by exerting the pulling force, for example, as shown by the left-pointing arrows 306, 308 or the pushing force, for example, as shown by the upward pointing arrows 314 on the lever 300.

Figure 3C:
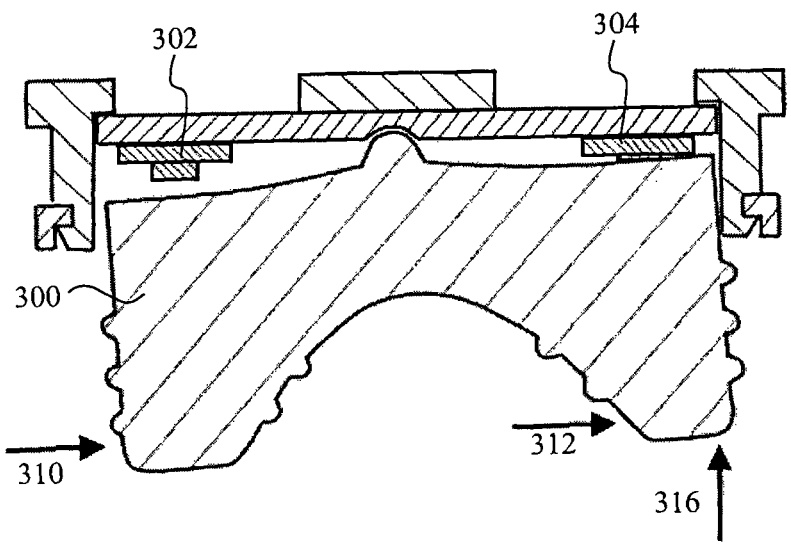

For example, FIG. 3C shows the activation of the second switch 304 by exerting a flicking force, for example, as shown by the right-pointing arrows 310, 302 or a pushing force, for example, as shown by the upward pointing arrows 316 on the lever 300.

For example, in various context, the lever 300, the first switch 302 and the second switch 304 may be the lever 206, the first switch 208 and the second switch 210 of FIG. 2.

In various embodiments, the lever 206 (for example, the lever 300 of FIGS. 3A to 3C) may be an arc-shaped lever having a concave part 318 located between the first end region 320 and the second end region 322 of the lever 300, wherein the first end region 320 is located opposite to the second end region 322.

The end region may further include to a leg or an extension or a protrusion. For example, the leg, the extension or the protrusion may be formed or disposed on another surface of the end region, this other surface being different from the surface contacting the switch. In one example, the other surface may be the top surface with reference to the bottom surface of the end region which may be configured to contact or abut the switch. The concave part 318 may be located between the leg, the extension or the protrusion of the first end region 320 and the leg, the extension or the protrusion of the second end region 322 of the lever 300.

In the context of various embodiments, the phrase "concave part" may be but is not limited to being interchangably referred to as a groove, a sunken area or a sunken part, a caved part, a curved part, a dip, a dish, a crescent part/feature, a moon-shaped part/feature, or a recessed portion relative to the top edge of the leg/extension/protrusion. In some examples, a plurality of projections such as "small bumps" may be formed on the leg, the extension or the protrusion. The plurality of projections or small bumps provide better grip or more friction between the leg, the extension or the protrusion and a user's finger contacting the leg, the extension or the protrusion during gameplay.

In various embodiments, the lever 206 (for example, the lever 300 of FIGS. 3A to 3C) may be configured to pivot about the pivot point to the first position by exerting the pulling force, for example, as shown by the left-pointing arrow 306 from inside of the concave part 318 towards the first end region 320 of the lever 300.

In various embodiments, the lever 206 (for example, the lever 300 of FIGS. 3A to 3C) may be configured to pivot about the pivot point to the second position by exerting the flickering force, for example, as shown by the right-pointing arrow 312 from inside of the concave part 318 towards the second end region 322 of the lever 300.

In various embodiments, the lever 206 (for example, the lever 300 of FIGS. 3A to 3C) may be configured to pivot about the pivot point to the first position or the second position by exerting the pushing force, for example, as shown by the upward pointing arrows 314, 316 onto the first or second end region 320, 322 of the lever 300 respectively.

In various embodiments, the second switch 210 may be deactivated when the lever 206 is in the first position. The first switch 208 may be deactivated when the lever 206 is in the second position. As used herein, the term "deactivated" has the opposite meaning to the term "activated" as defined hereinabove and may be interchangably referred to as untriggered, turned off, or ended.

In further embodiments, the lever 206 may be configured to pivot about a pivot point to the first position in which the first switch 208 is activated to send a first signal indicating that a first gaming function is to be executed; and the lever 206 may be configured to pivot about the pivot point to the second position in which the second switch 210 is activated to send a second signal indicating that a second gaming function is to be executed. The pivot point may be as defined above.

In the context of various embodiments, the term "signal" generally refers to an electrical signal and may mean a message or an instruction. The term "indicating" refers to reflecting or representing. The phrase "gaming function" generally means an algorithm to perform an action or an instruction in a video or computer game.

In various embodiments, irrespective of the lever 206 being configured to pivot about the pivot point to the first or second position, the first signal may be the same as the second signal. It should be appreciated that the term "same" may mean identical, equivalent, exact duplicate, substantially identical, or substantially equivalent.

In other embodiments, the first signal may be different from the second signal.

In various embodiments, the plurality of game controls 204 and the lever 206 may be configured to be actuated to send a plurality of signals indicating that a plurality of gaming functions is to be executed.

In further embodiments, the plurality of game controls 204 may be configured to be actuated to send a plurality of signals indicating that a plurality of gaming functions is to be executed. The lever 206 may be configured to pivot about a pivot point to the first position in which the first switch 208 is activated or the second position in which the second switch 210 is activated to send another signal indicating that at least part of the plurality of gaming functions is to be executed.

In yet further embodiments, the plurality of game controls 204 may be configured to be actuated to send a plurality of signals indicating that a plurality of gaming functions is to be executed. The lever 206 may be configured to pivot about a pivot point to the first position in which the first switch 208 is activated or the second position in which the second switch 210 is activated to send another signal indicating that another gaming function different from the plurality of gaming functions is to be executed.

In various embodiments, the lever may also be configured to switch to the neutral position to send a signal indicating that a gaming function is to be executed.

In various embodiments, the game controller may further include a pair of handles; and if a user plants each palm to the respective handle, a first finger and a second finger of a hand of the user assess the plurality of game controls 204 on the first side of the housing 202 and the lever 206 disposed on the second side of the housing 202 is a position to be operable by a third finger of the hand. For example, the pair of handles may be the handles 606, 608 of FIG. 6A. The lever 206 may have a concave part, for example, the concave part 318 of FIG. 3A for the third finger of the hand such that the lever 206 can be pivoted about a pivot point to the first position by pressing the first end region of the lever 206 with an upper side of the third finger and to the second position by pressing the second end region of the lever with an underside of the third finger.

In this context, the underside of the third finger refers to a fingerprinted surface of the hand.

In various embodiments, the first, second and third fingers of the hand may refer to a thumb, an index finger and a middle finger of the hand, respectively.

In various embodiments, the lever 206 may be disposed at a substantially centre region of the second side of the housing 202.

It should be appreciated and understood that the term "substantially" may include "exactly" and "similar" which is to an extent that it may be perceived as being "exact". For illustration purposes only and not as a limiting example, the term "substantially" may be quantified as a variance of +/−5% from the exact or actual. For example, the phrase "A is (at least) substantially the same as B" may encompass embodiments where A is exactly the same as B, or where A may be within a variance of +/−5%, for example of a value, of B, or vice versa.

The lever 206 may be disposed anywhere on the second side of the housing 202 such that the lever 206 may be assessed or reached by at least the middle finger.

Figure 4:
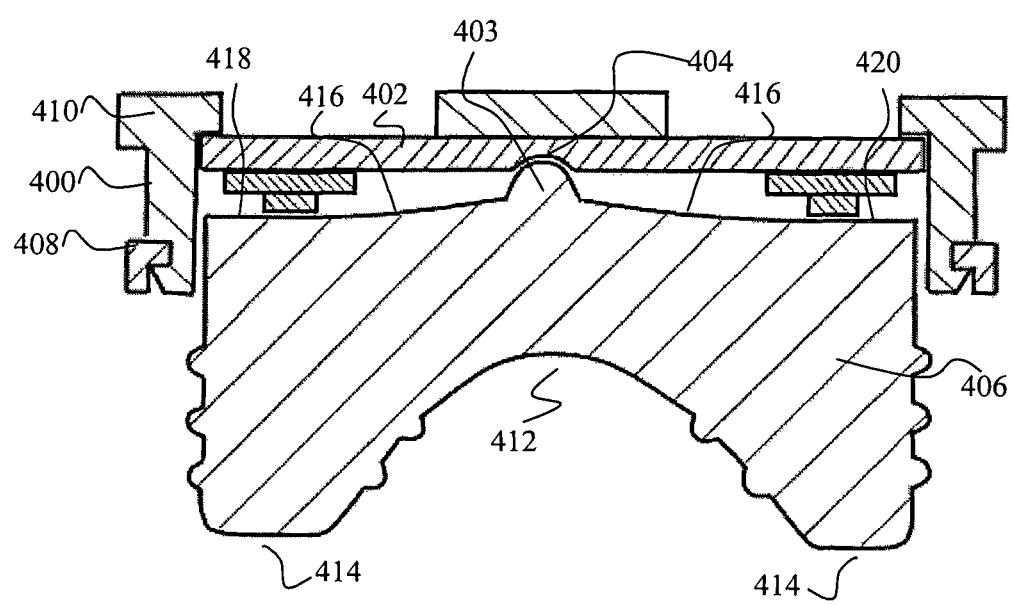
FIG. 4 shows a cross-sectional view of an exemplary housing configured to hold a switch assembly including a lever, according to various embodiments.

In various embodiments, the housing 202 may be configured to hold a switch assembly comprising the lever 206, the first switch 208 and the second switch 210. FIG. 4 shows an exemplary housing 400 which may refer to the housing 202 of FIG. 2 according to various embodiments. In FIG. 4, the housing 400 holds the switch assembly 402 such that the pivot point 403 of the lever 406 may be configured to sit or reside in a notch or cavity 404 of the housing 400 to provide the pivoting of the lever 406. For example, more specifically in FIG. 4, a frame 410 of the housing 400 may hold the PCB switch assembly 402. In an example, the notch 404 may be formed as part of the frame 410 or as part of the PCB assembly 402.

The lever 406 may refer to the lever 206 of FIG. 2. For example, the lever 406 may be a moon-shaped rocker for a user to place his finger either inside a crescent/concave feature 412 of the moon-shaped rocker or outside. The rocker may also be pushed underneath when the finger is below pushing features 414. When finger is outside the crescent/concave feature 412, for example, at least near the pushing features 414, a flicking action and a pulling action may still be done.

Surfaces 416 of the lever 406 which extend from the notch 404 may be tapered and then level with the contact surfaces 418, 420.

In an embodiment, the switch assembly 402 may be a printed circuit board (PCB) switch assembly. A PCB switch assembly refers to a circuit board including printed tracks for conducting electrical signals upon actuating of the switch (es) connected to the PCB.

In various embodiments, the game controller may further include a cover, for example, the cover 408 of FIG. 4, configured to hold parts of the game controller within the housing 400. For example, the cover 400 prevents any parts from falling out of the game controller.

In various embodiments, the game controller may further include another lever disposed on the second side of the housing 202, a third switch configured to contact a first end region of the other lever; and a fourth switch configured to contact a second end region of the other lever.

In the context of various embodiments, the other lever may be defined as the lever 206 above. The phrases "switch" and "end region" may be defined as above.

In one embodiment, the other lever may be positioned adjacent to the lever 206.

As used herein, the term "adjacent" refers to neighbouring, in close proximity, next to, or on the side of.

In various embodiments, the lever 206 and the other lever may be positioned about 1 cm to about 5 cm apart from each other.

The lever 206 and the other lever may be but is not limited to be positioned about 1.5 cm, about 2.0 cm, about 2.5 cm, about 3.0 cm, about 3.5 cm, about 4.0 cm or about 4.5 cm apart from each other. It should be appreciated that the separation distance between the lever 206 and the other lever may taken any value as long as the user is able to hold the game controller by its handles and allow at least one of his middle fingers, index fingers or little fingers reach the lever 206 and the other lever.

In various embodiments, the other lever may be configured to pivot about another pivot point to a position in which the third switch is activated to send a third signal indicating that a third gaming function is to be executed. The other lever may also be configured to pivot about the other pivot point to another position in which the fourth switch is activated to send a fourth signal indicating that a fourth gaming function is to be executed.

The terms "signal", "indicating", and "gaming function" are as defined above.

In some embodiments, irrespective of the other lever being configured to pivot about the other pivot point to the position or the other position of the other lever, the third signal may be the same as the fourth signal.

In other embodiments, the third signal may be different from the fourth signal.

In an embodiment, the third signal may be the same as the first signal.

In another embodiment, the fourth signal may be the same as the second signal.

In various embodiments, same signals may indicate to execute the same gaming functions, while different signals may indicate to execute different gaming functions.

The lever 206 and/or the other lever may be actuated alone or in combination with each other and/or with the plurality of game controls 204 to send different signals for executing different gaming functions.

In various embodiments, the lever 206 may be detachable from the second side of the housing 202.

As used herein, the term "detachable" refers to the lever 206 being able to be connected (secured) to or removed from the second side of housing 202. By detaching the lever 206, the game controller 200 may be stored away compactly and easily. A storage unit or bag for a conventional game controller may be used to contain the game controller 200 with the lever 206 detached. Further, transporting the game controller 200 with the lever 206 detached may also be desirable so that the lever 206 does not protrude from the game controller 200 and would therefore be less susceptible to damage during transportation.

Additionally, the game controller 200 may be configured to perform with enhancements provided by the lever 206 or to perform as a conventional game controller when the lever 206 is detached.

The game controller 200 may further include a securing means configured to detachably secure the lever 206 to the second side of the housing 202. For example, the "securing means" may be but is not limited to a screw.

Figure 5A:
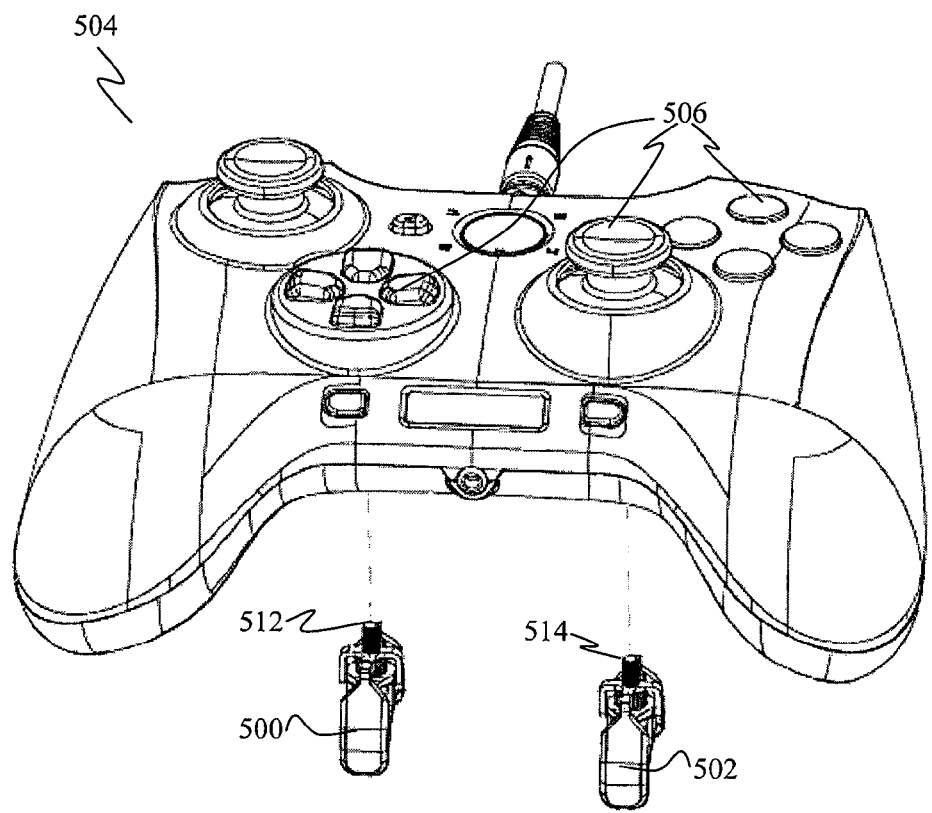
FIGS. 5A and 5B show perspective view of the game controller as seen from its top and its underneath side respectively, in accordance to various embodiments.
Figure 5B:
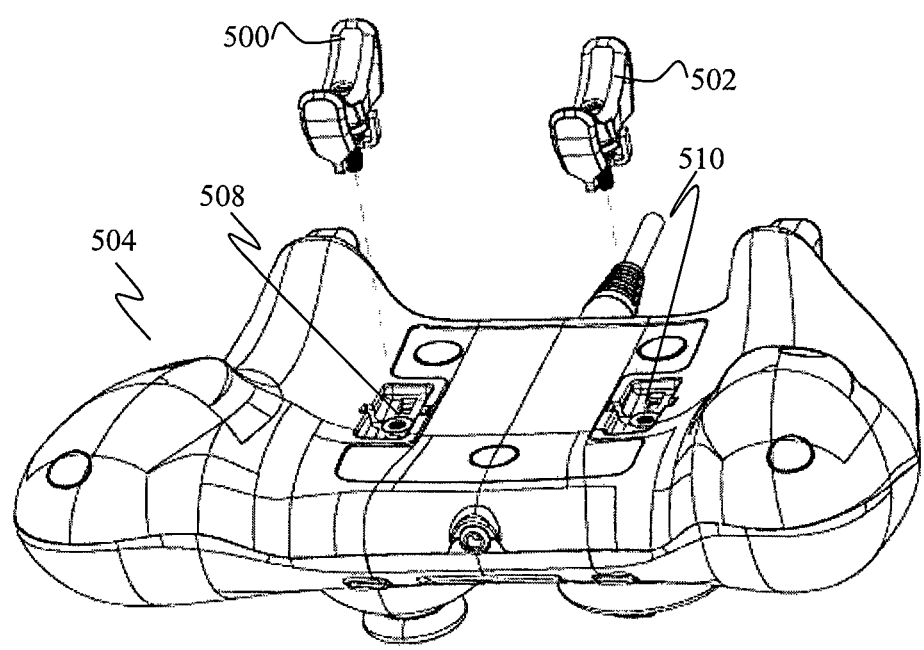

In an example, levers 500, 502, which are detachable from a game controller 504, are shown in FIG. 5A illustrating a perspective view of the game controller 504 as seen from its top side accommodating a plurality of game controls 506, and in FIG. 5B illustrating another perspective view of the game controller 504 on its underneath (bottom) side having respective recesses 508, 510 to receive the levers 500, 502. The levers 500, 502 are detachably secured by respective screws 512, 514. The recesses 508, 510 may be formed on the housing at the underneath side of the game controller 504.

For example, each of the levers 500, 502 may be the lever 206 of FIG. 2 and the game controller 504 may be the game controller 200 of FIG. 2.

Figure 5C:
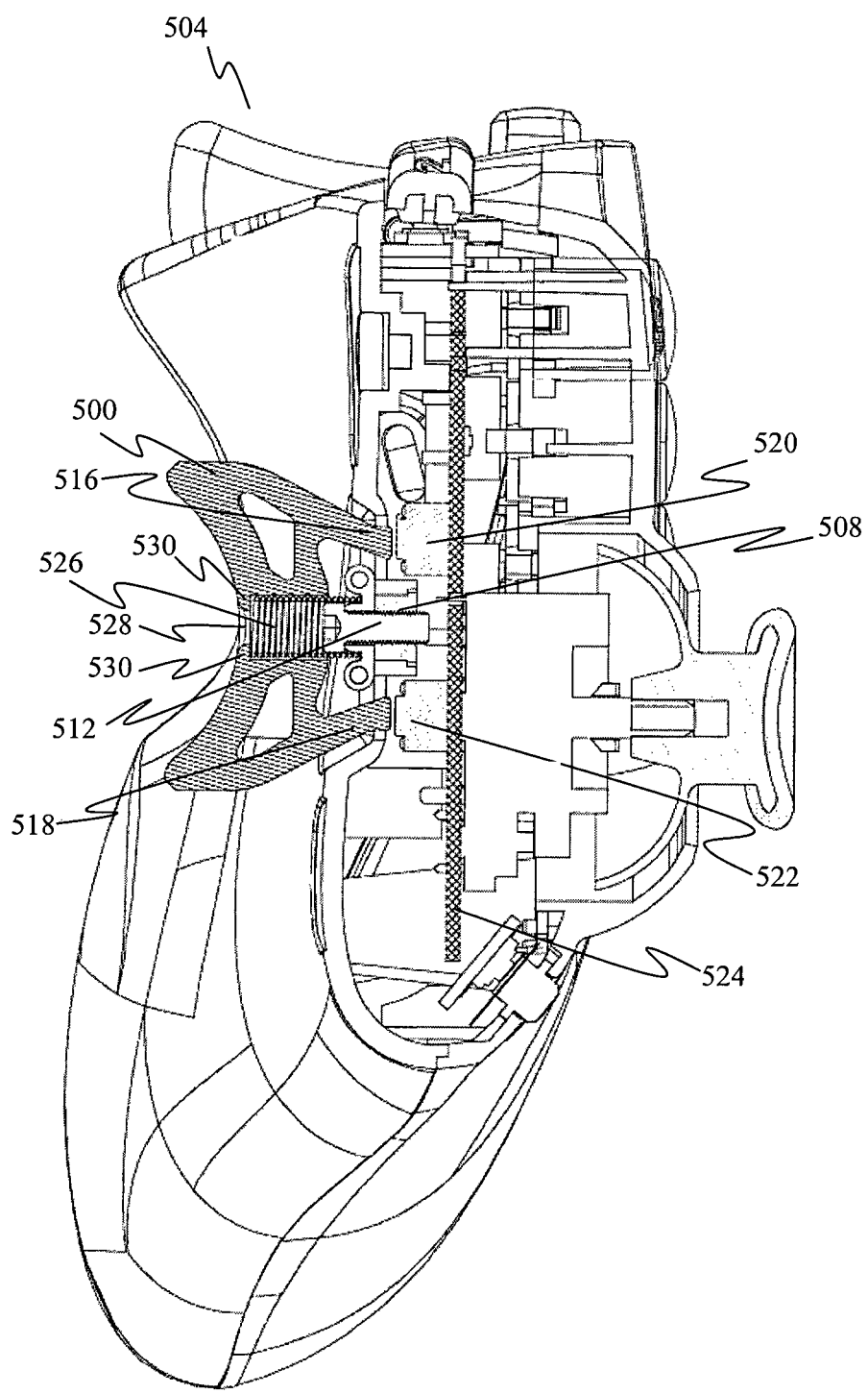
FIG. 5C shows a cross-sectional view of the lever secured to the game controller, in accordance to various embodiments.

To further illustrate, FIG. 5C shows a cross-sectional view of the lever 500 secured to the game controller 504 by the screw 512 via the respective recess 508 as an example. The lever 500 has contact surfaces 516, 518 configured to contact a first switch 520 and a second switch 522, respectively. The first switch 520 and the second switch 522 are placed on a printed circuit board 524. For example, the first switch 520 may be the first switch 208 of FIG. 2 and the second switch 522 may be the second switch 210 of FIG. 2.

In various embodiments, the lever 206 may further include a biasing means configured to provide a biasing force to the lever 206. For example, the "biasing means" may be made of a resilient material. The biasing means may be but is not limited to a spring. For example, in FIG. 5C, the biasing means or spring 526 may be arranged between the screw 512 (i.e., the securing means) and the lever 500. The spring 526 may have a diameter equal to or smaller than the head of the screw 512 which is in contact with the spring 526. When the lever 500 is secured to the game controller 504, the spring 526 is compressed; thereby providing a cushioning effect between the screw 512 and the lever 500. When the lever 500 is detached from the game controller 504, the spring 526 is extended to provide a pushing force to more easily separate the lever 500 from the game controller 504.

To detachably secure the lever 500 to the game controller 504, the lever 500 may have an orifice 528 which allows a screwdriver to access the head of the screw 512 so that a user may fasten the screw 512 to the recess 508 using the screwdriver. The spring 526 and the head of the screw 512 may be held in place in the orifice 528 by a tapered edge 530 of the orifice 528. In some example, the spring 526 may have a smaller diameter than that of the head of the screw 512. The description above may be similarly applicable to the lever 502 having its respective screw 514 securable to its respective recess 510.

In various embodiments, the game controller 200 may further include a bracket configured to hold the securing means to the lever 206. In this embodiment, the lever 206 may be configured to pivot about the bracket to the first position and the second position.

Figure 6A:
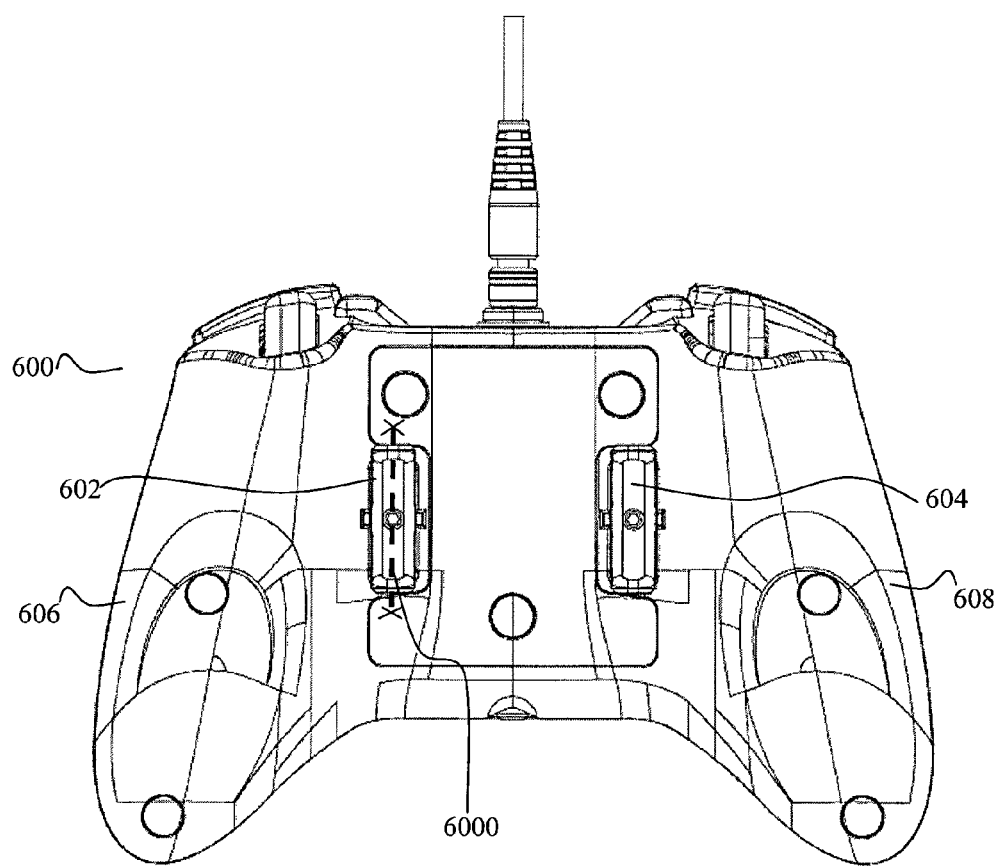
FIG. 6 shows (A) a plan view, (B) a side view and (C) an end view of an exemplary game controller, according to various embodiments.
Figure 6B:
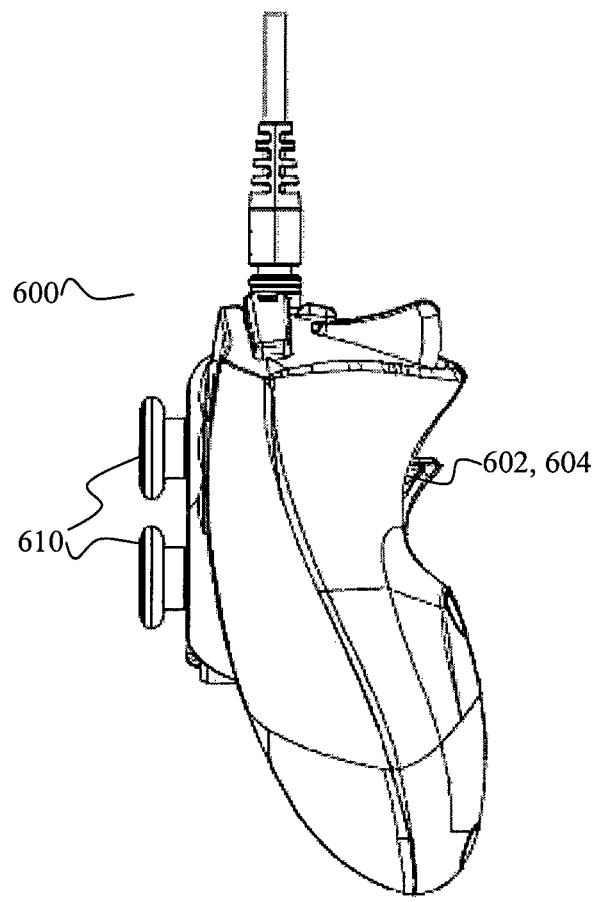
Figure 6C:
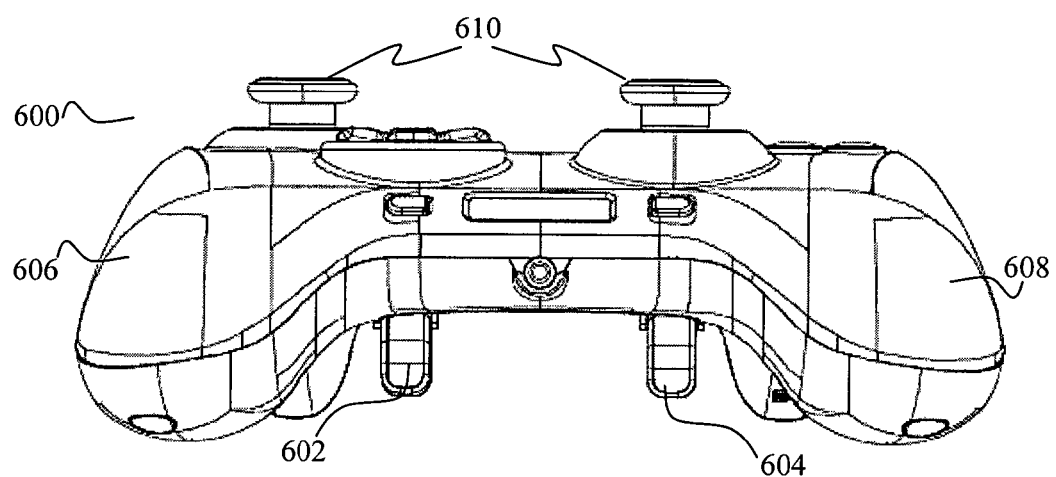

FIG. 6A shows a plan view of an exemplary game controller 600 according to various embodiments. The game controller 600 may refer to the game controller 200 of FIG. 2. FIGS. 6B and 6C respectively show a side view and an end view of the exemplary game controller 600 of FIG. 6A.

In FIGS. 6A to 6C, the levers 602, 604 located at the underside (or bottom) of the game controller 600 (or gamepad) are capable of being triggered using the middle finger of a user by using either a pulling action, a flicking action or a pushing action. A plurality of game controls 610 (FIG. 6B) are located on the upper side of the game controller 600 and are capable of being triggered using the user's thumb or index finger. For example, the levers 602, 604 may be referred to the lever 206 of FIG. 2, or the lever 300 of FIGS. 3A to 3C, or the lever 406 of FIG. 4, or the levers 500, 502 of FIG. 5A. FIGS. 3A to 3C, 4 and 5C provide respective cross-sectional views of the lever seen from the dotted line 6000 of FIG. 6A. In an example, the plurality of game controls 610 may be referred to the plurality of game controls 204 of FIG. 2.

Figure 7:
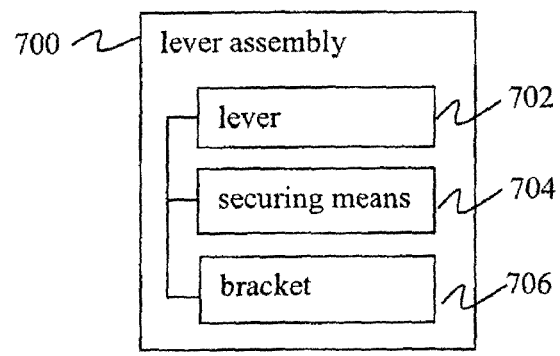
FIG. 7 a schematic block diagram of a lever assembly, in accordance to various embodiments.

In another aspect, a lever assembly 700 for a game controller is provided as shown in FIG. 7. In FIG. 7, the lever assembly 700 may include a lever 702 configured to pivot between a neutral position in which the lever 702 returns when no force is applied thereon, a first position in which the lever 702 moves when a force is applied on one end of the lever 702 and a second position in which the lever 702 moves when another force is applied to another end of the lever 702; a securing means 704 configured to detachably secure the lever 702 to a game controller; and a bracket 706 configured to hold the securing means 704 to the lever 702.

In various embodiment, the lever assembly 700 may further include a biasing means configured to provide a biasing force to the lever 702.

The terms "lever", "game controller", "side", "activated", "switch", "securing means", and "biasing means" may be as defined above.

For example, the lever 702 may be the lever 206 of FIG. 2, or the lever 300 of FIGS. 3A to 3C, or the lever 406 of FIG. 4, or the levers 500, 502 of FIG. 5A, or the levers 602, 604 of FIG. 6. The securing means 704 may be the respective screws 512, 514 of FIG. 5A and the biasing means may be the spring 526 of FIG. 5C.

Figure 8A:
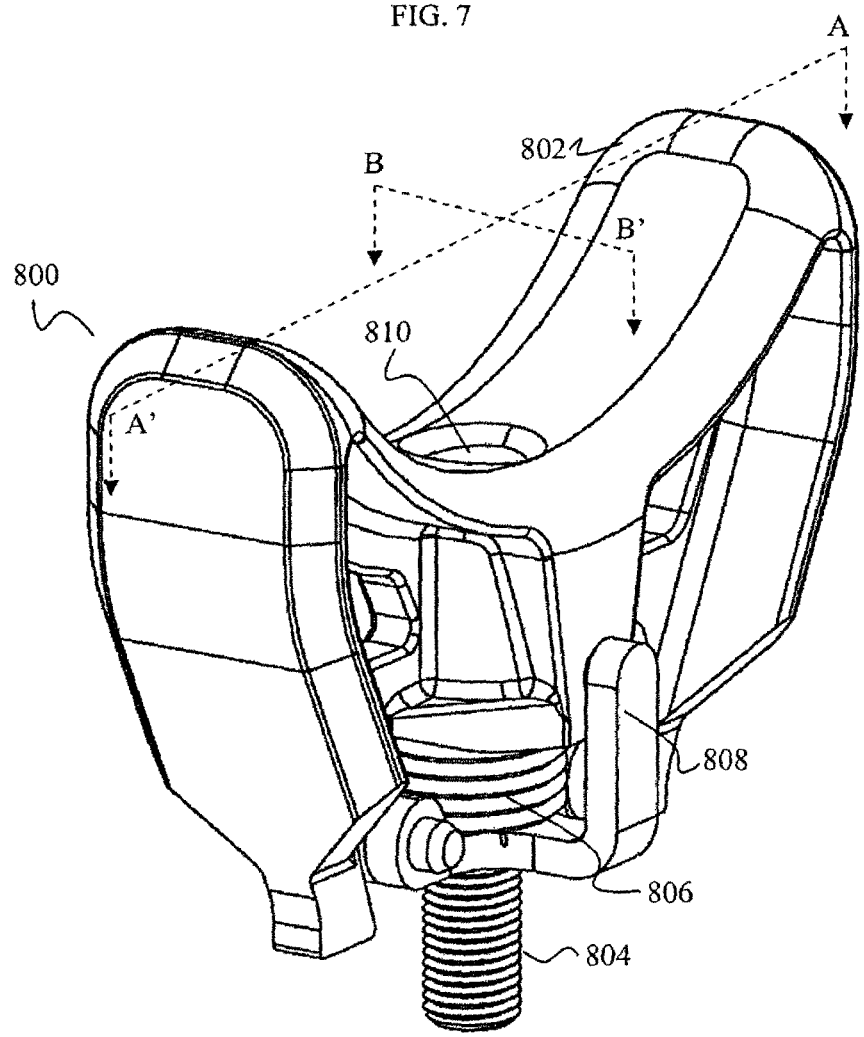
FIGS. 8A and 8B respectively show a perspective view and an exploded view of the lever assembly, in accordance to various embodiments.
Figure 8B:
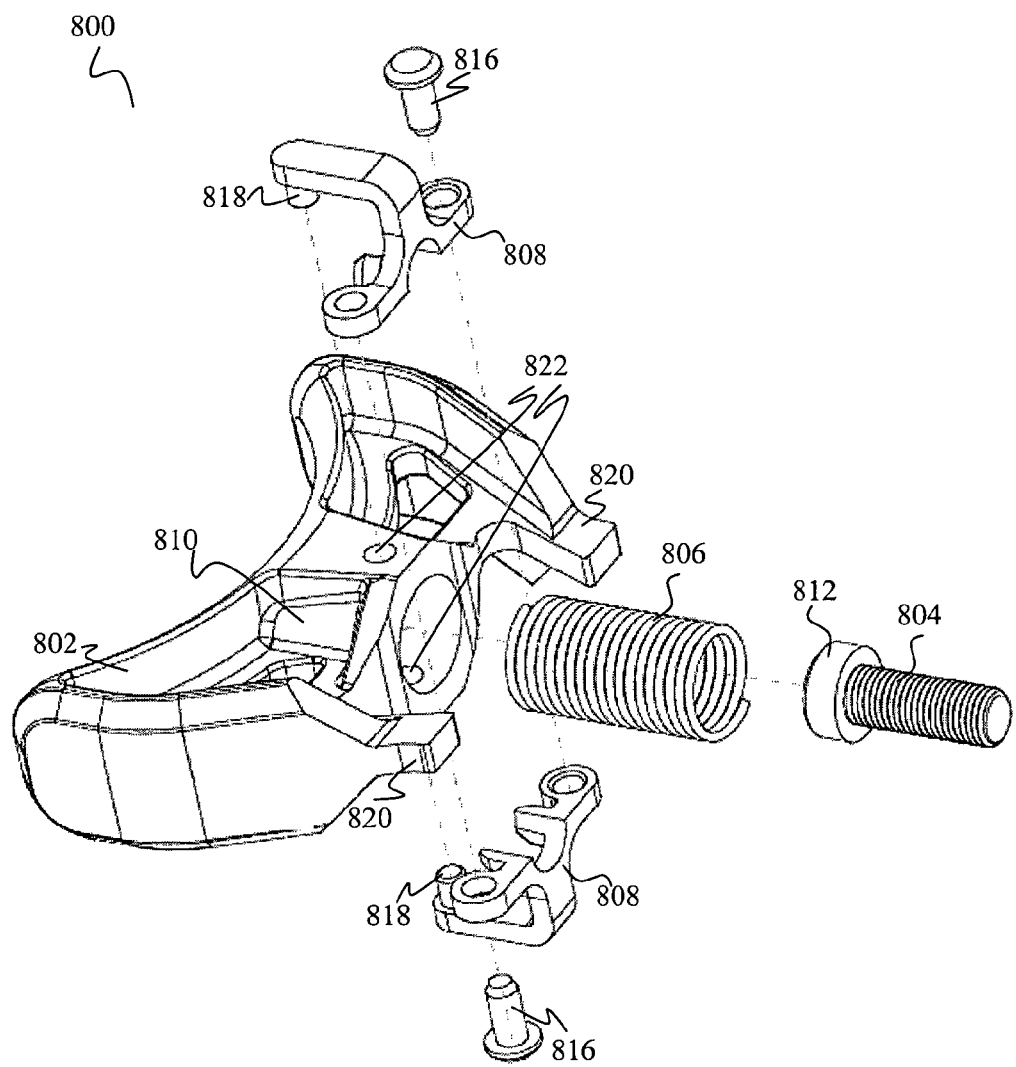

In FIGS. 8A to 8I, various views of an exemplary lever assembly 800 (e.g., may be the lever assembly 700 of FIG. 7) are shown. FIGS. 8A and 8B respectively show a perspective view and an exploded view of the lever assembly 800 including a lever 802, a securing means 804, a biasing means 806 arranged between the lever 802 and the securing means 804, and a bracket 808 configured to hold the securing means 804 to the lever 802. The lever 802 may be pivotable about the bracket 808. In other words, the bracket 808 may act as a fulcrum (or pivot) support means for the lever 802. The bracket 808 may be securable to a game controller (not shown in FIGS. 8A and 8B) by the securing means 804.

As can be seen in FIG. 8B, the securing means 804 includes a head 812 having a diameter that is larger than or similar to the diameter of the biasing means 806, more specifically, the inner diameter of the biasing means 806. This is to allow the head 812 to contact or anchor against an end of the biasing means 806 such that the biasing force may be exerted by the biasing means 806 based on a securing action or a unsecuring (detaching) action of the securing means to a game controller (not shown in FIG. 8B).

The biasing means 806 and the securing means 804 are disposed within an orifice 810 formed in the lever 802. For example, the orifice 810 may be the orifice 528 of FIG. 5C. The biasing means 806 and the head 812 of the securing means 804 may be held in place in the orifice 810 by a tapered edge of the orifice 810. In one non-limiting example, the biasing means 806 may have a smaller diameter than that of the head 812 of the securing means 804. As a result, the larger head 812 may function as a blocking mechanism to prevent the securing means 804 from being displaced through the orifice 810. However, it should be appreciated that in an alternative non-limiting example, the head 812 of the securing means 804 may have a smaller diameter than the diameter of the biasing means 806, or more specifically, the inner diameter of the biasing means 806. In this example, it may be possible to prevent the securing means 804 from being displaced through the orifice 810 by having the tapered edge of the orifice 810 functioning as the block mechanism.

Figure 8C:
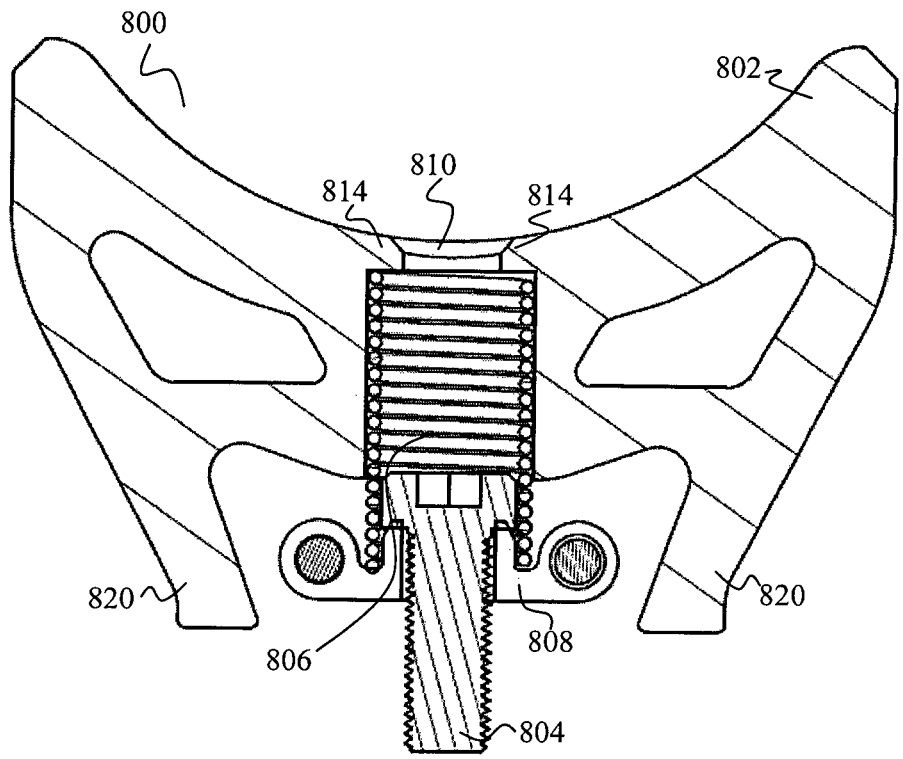
FIGS. 8C and 8D respectively show a cross-sectional plan view and a cross-sectional side view of the lever assembly, in accordance to various embodiments.
Figure 8D:
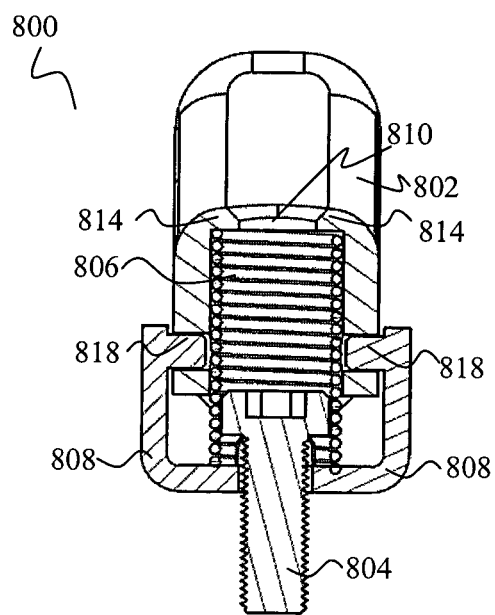

In cross-sectional plan and side views of the lever assembly 800 of FIGS. 8C and 8D as seen from dotted lines A-A' and B-B' of FIG. 8A, respectively, one end of the biasing means 806 is abutting the bracket 808 while another end of the biasing means 806 is abutting the lever 802 toward the narrowed or tapered edge of the orifice 810. This narrowed or tapered edge may appear as or may be represented by protrusions 814 of the lever 802 as seen in FIGS. 8C and 8D. Similarly to the levers 500, 502 of FIG. 5A, to detachably secure the lever 802 to the game controller, a screwdriver may be allowed to access the head 812 of the securing means 804 via the orifice 810 of the lever 802 such that a user may fasten the securing means 804 to a recess of the housing of the game controller (not shown in FIG. 8) using the screwdriver. Upon securing the lever assembly 800 to the game controller, contact surfaces 820 of the lever 802 may be configured to contact the first switch and the second switch of the game controller respectively. For example, the first switch may be the first switch 520 and the second switch may be the second switch 522 of FIG. 5C.

The bracket 808 may act as a clamp to secure the securing means 804 to the lever 802. The bracket 808 includes fasteners 816 to hold in a clamped configuration as shown in a perspective bottom view of the level assembly 800 in FIG. 8E. The fasteners 816 may be but are not limited to rivets (also seen in FIG. 8B). The lever 802 may be pivotable about the bracket 808. For example, the bracket 808 may provide a fulcrum (or pivot) support means for the lever 802.

Such an arrangement of the lever assembly 800 allows the biasing means 806 and the securing means 804 to be arranged to the lever 802.

The lever 802 may be configured to pivot about the bracket 808 to the first position and the second position. For example, in FIG. 8B, extensions 818 from the bracket 808 may be received by respective cavities 822 of the lever 802. The lever 802 may rotate about these extensions 818 to a neutral position, the first position and the second position. In a different example, the extensions may be provided on the lever while the cavities receiving these extensions may be located on the bracket. It should be understood and appreciated that the extensions and the receiving cavities may be formed on the lever and the bracket in any configuration as long as the lever may be adapted to pivot about the bracket.

Figure 8E:
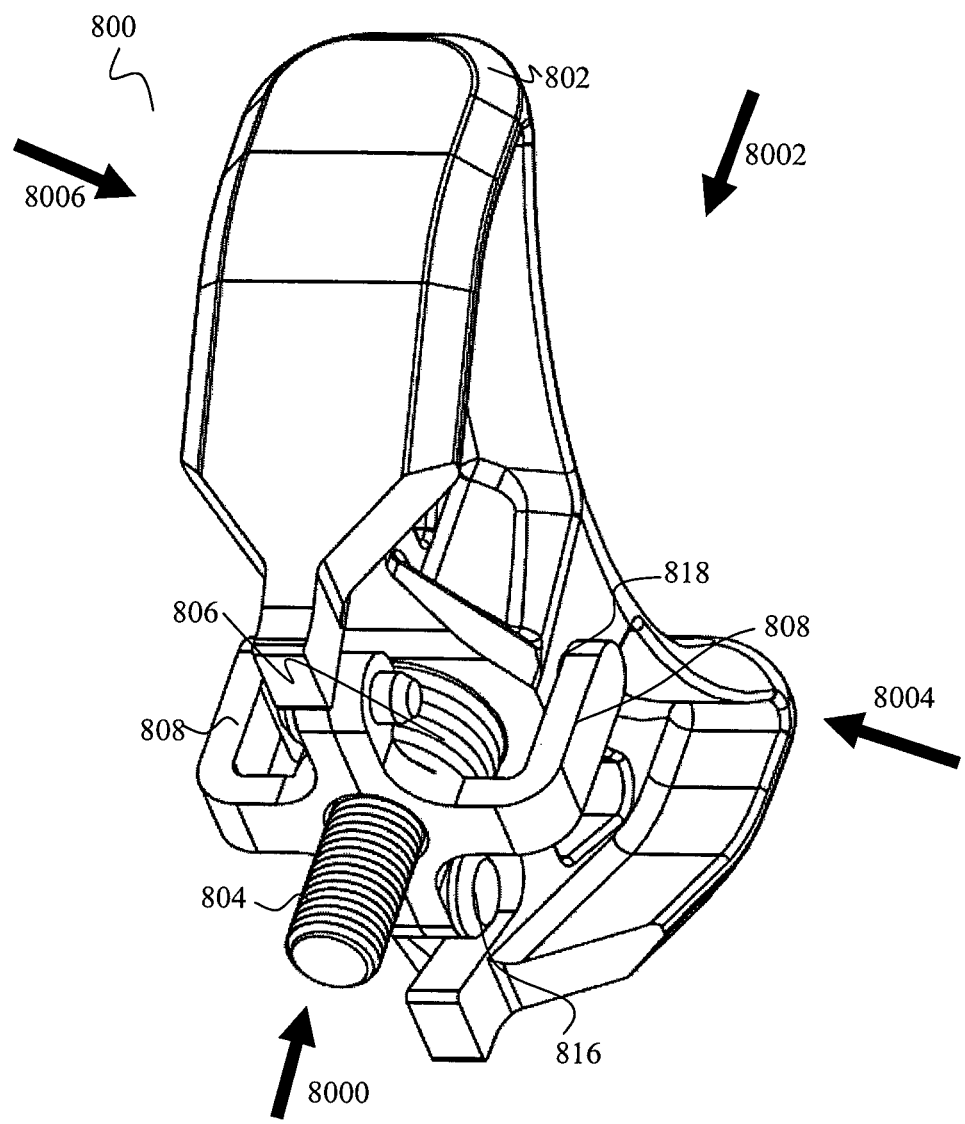
FIG. 8E shows a perspective bottom view of the level assembly, in accordance to various embodiments.
Figure 8F:
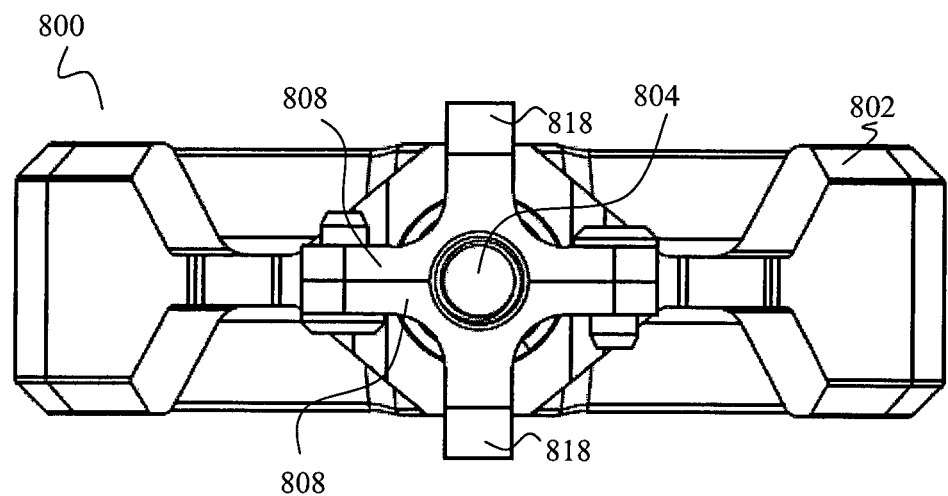
FIGS. 8F to 8I respectively show a bottom view, a top view, a plan view and a side view of the lever assembly, in accordance to various embodiments.
Figure 8G:
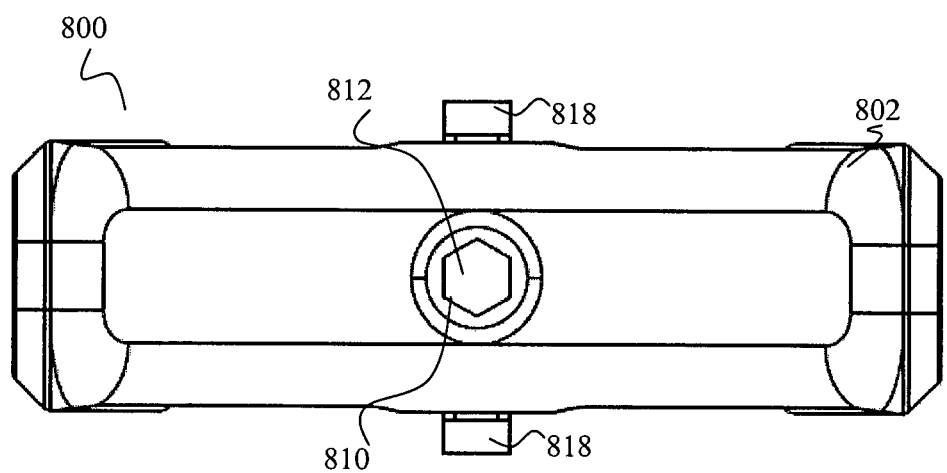
Figure 8H:
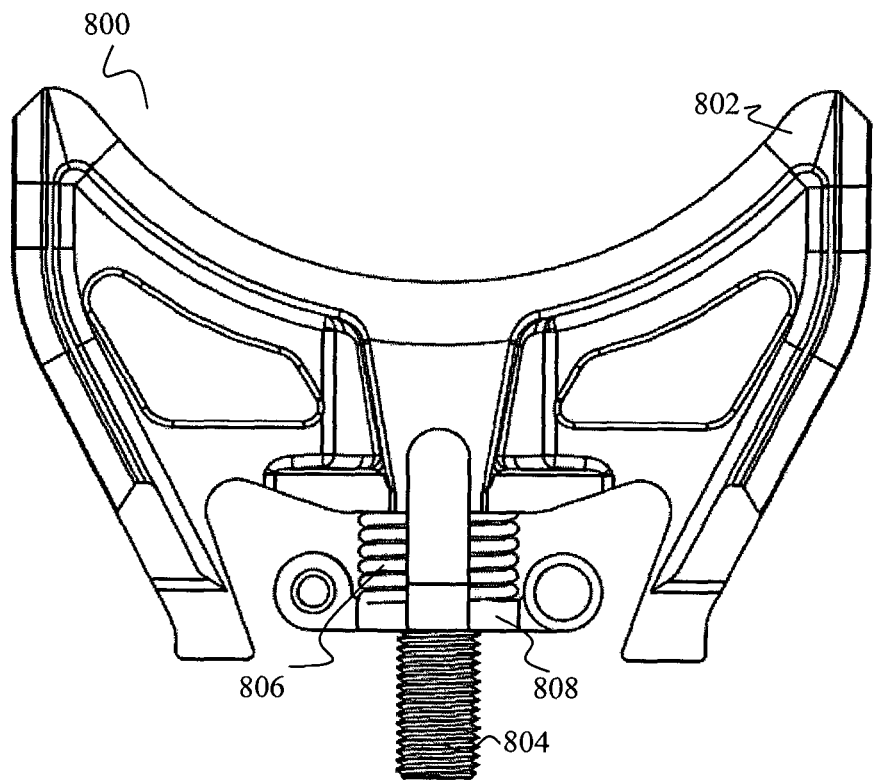
Figure 8I:
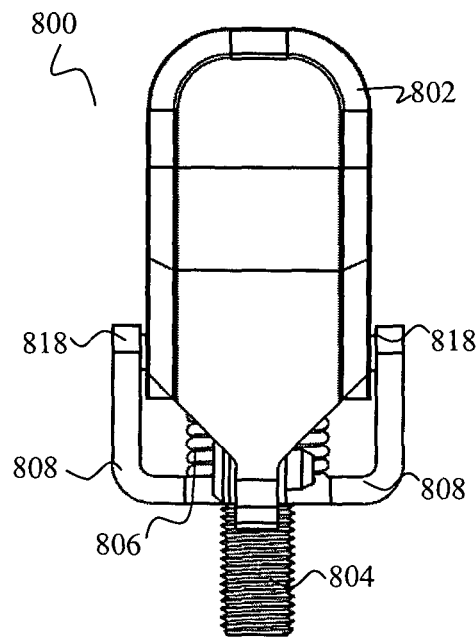

FIGS. 8F to 8I respectively show a bottom view, a top view, a plan view and a side view of the lever assembly 800 as seen from directions denoted by respective arrows 8000, 8002, 8004, 8006 in FIG. 8E.

For example, the lever 802 may be the lever 206 of FIG. 2, or the lever 300 of FIGS. 3A to 3C, or the lever 406 of FIG. 4, or the levers 500, 502 of FIG. 5A, or the levers 602, 604 of FIG. 6 or the lever 702 of FIG. 7. The securing means 804 may be the securing means 704 of FIG. 7, or the respective screws 512, 514 of FIG. 5A; and the biasing means 806 may be the spring 526 of FIG. 5C.

In the context of various embodiments, the term "about" as applied to a numeric value encompasses the exact value and a variance of +/−5% of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A game controller comprising:
a housing;
a plurality of game controls disposed on a first side of the housing;
a lever comprising an orifice with a tapered edge;
a first switch configured to contact a first end region of the lever;
a second switch configured to contact a second end region of the lever;
a bracket configured to pivotably engage the lever;

a biasing means configured to provide a biasing force to the lever, the biasing means disposed within the orifice, wherein a first end of the biasing means abuts the bracket and a second end of the biasing means abuts the tapered edge; and a securing means anchoring against the biasing means, the securing means fastenable via the orifice to detachably secure the lever to a second side of the housing;

wherein the lever is configured to pivot about the bracket, to a neutral position when no force is applied thereon, wherein the lever is configured to pivot to a position, the position being one of a first position in which the first end region contacts the first switch to activate the first switch, or a second position in which the second end region contacts the second switch to activate the second switch, wherein the position depends on a force applied on the lever.

2. The game controller of claim 1, wherein the first side of the housing is an upper side of the housing and the second side of the housing is an underside of the housing.

3. The game controller of claim 1, wherein the lever is configured to pivot from the first position to the second position via the neutral position.

4. The game controller of claim 1, wherein the first switch is activated when a force into the direction of the first switch is applied to the lever.

5. The game controller of claim 1, wherein the lever is configured to pivot about a pivot point to the first position or the second position by exerting a pulling force or a flicking force or a pushing force on the lever into the direction of the first switch and the direction of the second switch, respectively, wherein the pulling force is a force exerted in an opposite direction to the flicking force.

6. The game controller of claim 1, wherein the second switch is deactivated when the lever is in the first position.

7. The game controller of claim 1, wherein the first switch is deactivated when the lever is in the second position.

8. The game controller of claim 1,
wherein the lever is configured to pivot about a pivot point to the first position in which the first switch is activated to send a first signal indicating that the first gaming function is to be executed; and
wherein the lever is configured to pivot about the pivot point to the second position in which the second switch is activated to send a second signal indicating that the second gaming function is to be executed.

9. The game controller of claim 8, wherein irrespective of the lever being configured to pivot about the pivot point to the first or second position, the first signal is the same as the second signal.

10. The game controller of claim 8, wherein the first signal is different from the second signal.

11. The game controller of claim 1, wherein the plurality of game controls comprises at least one of a pushbutton, a joystick or a directional pad.

12. The game controller of claim 1, wherein the plurality of game controls and the lever are configured to be actuated to send a plurality of signals indicating that a plurality of gaming functions is to be executed.

13. The game controller of claim 1,
wherein the plurality of game controls are configured to be actuated to send a plurality of signals indicating that a plurality of gaming functions is to be executed; and
wherein the lever is configured to pivot about a pivot point to the first position in which the first switch is activated or the second position in which the second switch is activated to send another signal indicating that at least part of the plurality of gaming functions is to be executed.

14. The game controller of claim 1,
wherein the plurality of game controls are configured to be actuated to send a plurality of signals indicating that a plurality of gaming functions is to be executed; and
wherein the lever is configured to pivot about a pivot point to the first position in which the first switch is activated or the second position in which the second switch is activated to send another signal indicating that another gaming function different from the plurality of gaming functions is to be executed.

15. The game controller of claim 1, wherein the game controller further comprises a pair of handles.

16. The game controller of claim 15, wherein the lever has a concave part such that the lever can be pivoted about a pivot point to the first position by pressing the first end region of the lever and to the second position by pressing the second end region of the lever, wherein the concave part is the recessed portion.

17. The game controller of claim 1, wherein the lever is disposed at a centre region of the second side of the housing.

18. The game controller of claim 1, wherein the housing is configured to hold a switch assembly comprising the lever, the first switch and the second switch.

19. The game controller of claim 1, further comprising a cover configured to hold parts of the game controller within the housing.

20. The game controller of claim 1, wherein the lever is detachable from the second side of the housing.

* * * * *